(12) United States Patent
Christmann et al.

(10) Patent No.: US 12,460,987 B2
(45) Date of Patent: Nov. 4, 2025

(54) SYSTEMS AND METHODS FOR CALIBRATING A LEAK TEST MACHINE FOR A MANUFACTURING LINE

(71) Applicant: ATS CORPORATION, Cambridge (CA)

(72) Inventors: Steven Alan Christmann, Macomb, MI (US); Stanley Kleinikkink, Kitchener (CA)

(73) Assignee: ATS CORPORATION, Cambridge (CA)

( * ) Notice: Subject to any disclaimer, the term of this patent is extended or adjusted under 35 U.S.C. 154(b) by 538 days.

(21) Appl. No.: 17/707,158

(22) Filed: Mar. 29, 2022

(65) Prior Publication Data
US 2022/0334022 A1 Oct. 20, 2022

Related U.S. Application Data

(60) Provisional application No. 63/167,907, filed on Mar. 30, 2021.

(51) Int. Cl.
*G01M 3/28* (2006.01)
*G01M 3/00* (2006.01)

(52) U.S. Cl.
CPC .............. *G01M 3/28* (2013.01); *G01M 3/007* (2013.01)

(58) Field of Classification Search
CPC ........ G01M 3/28; G01M 3/225; G01M 3/243; G05B 19/41875; G05B 23/0283; G05B 2219/33002; G05B 2219/33027; G06N 20/00; G06N 3/02; G06N 5/046; G06F 17/18; G06F 18/2178
USPC ....... 702/85, 51, 188, 183, 50, 104, 117, 34, 702/184, 47, 100, 185, 45, 35, 33, 84, 98
See application file for complete search history.

(56) References Cited

U.S. PATENT DOCUMENTS

| | | | |
|---|---|---|---|
| 2008/0216560 A1* | 9/2008 | Ridgway | G01M 3/28 73/40.5 R |
| 2019/0121350 A1* | 4/2019 | Cella | G01M 13/028 |

FOREIGN PATENT DOCUMENTS

| | | | | |
|---|---|---|---|---|
| CA | 2994932 C | * | 3/2021 | ............. E21B 21/01 |
| CN | 2924531 Y | * | 7/2007 | |
| CN | 102053595 A | * | 5/2011 | |

(Continued)

OTHER PUBLICATIONS

Extended European Search Report, European Patent Office (Munich, Germany), Aug. 19, 2022.

*Primary Examiner* — Jeffrey P Aiello
(74) *Attorney, Agent, or Firm* — Valauskas Corder LLC

(57) ABSTRACT

Systems and methods for calibrating a leak test machine for a manufacturing line are provided. The leak test machine is configured to detect leakage defects in workpieces produced by the manufacturing line. The method involves operating at least one processor to: receive, from the leak test machine, defect data; receive, from at least one sensor, environmental data; update at least one predictive model using the defect data and the environmental data; receive, from the at least one sensor, current environmental data; determine at least one calibration setting for the leak test machine based on the at least one predictive model and the current environmental data, the at least one calibration setting compensating for an effect of the at least one current environment condition on the leak test machine; and test, with the leak test machine using the at least one calibration setting, at least one workpiece.

20 Claims, 8 Drawing Sheets

(56) References Cited

FOREIGN PATENT DOCUMENTS

| | | | | | |
|---|---|---|---|---|---|
| CN | 202869755 | U | * | 4/2013 | |
| CN | 103499417 | A | * | 1/2014 | |
| CN | 103939749 | A | * | 7/2014 | ............ G01M 3/243 |
| CN | 106197996 | A | * | 12/2016 | |
| CN | 108474710 | A | * | 8/2018 | ............ G01M 3/025 |
| KR | 101101976 | B1 | * | 1/2012 | ............. Y02E 30/30 |

* cited by examiner

SYSTEMS AND METHODS FOR
CALIBRATING A LEAK TEST MACHINE
FOR A MANUFACTURING LINE

CROSS-REFERENCE TO RELATED APPLICATIONS

This application claims the benefit of U.S. Provisional Patent Application No. 63/167,907, filed Mar. 30, 2021. The entire contents of U.S. Provisional Patent Application No. 63/167,907 is hereby incorporated by reference for all purposes.

FIELD

The described embodiments generally relate to calibrating machines for defect testing, and, in particular, to calibrating leak test machines for manufacturing lines.

BACKGROUND

The following is not an admission that anything discussed below is part of the prior art or part of the common general knowledge of a person skilled in the art.

Workpieces produced by a manufacturing line can have various imperfections or manufacturing defects. For example, a workpiece may have one or more unintended cracks, holes, or other unsealed portions, which allow liquids or gases to escape or release in an undesired manner (i.e., leak). Leak test machines can be used to detect leakage defects in workpieces. More specifically, leak test machines can use pressure to cause and detect the flow of liquid or gas escaping or releasing from the workpieces. Leak test machines can be highly sensitive to environmental conditions, such as temperature, pressure, or humidity. Leak test machines may also exhibit changes in performance due to changes in sensor performance, seal degradation, or mechanical alignment. Leak test machines may therefore require calibration to ensure accurate detection. However, environmental conditions, including workpiece conditions (e.g., workpiece temperature), can rapidly change within manufacturing facilities, and it can be difficult for manufacturing line operators to manually calibrate leak test machines in response to changes in environmental conditions in an accurate, yet timely manner. Failure to properly calibrate leak test machines may result in increased production costs due to defective workpieces being produced, or defectless workpieces being scrapped.

SUMMARY

The various embodiments described herein generally relate to methods (and associated systems configured to implement the methods) for calibrating a leak test machine for a manufacturing line. The leak test machine can be configured to detect leakage defects in workpieces produced by the manufacturing line.

An example method involves operating at least one processor to: receive, from the leak test machine, defect data indicating a plurality of defect test results for at least one workpiece; receive, from at least one sensor, environmental data indicating a plurality of environmental conditions at the leak test machine; and update at least one predictive model using the defect data and the environmental data. Each environmental condition corresponds to a defect test result obtained while the leak test machine was subject to that environmental condition. The at least one predictive model is operable to predict a defect test result for a workpiece based on at least one environmental condition at the leak test machine. The method further involves operating the at least one processor to: receive, from the at least one sensor, current environmental data indicating at least one current environmental condition at the leak test machine; determine at least one calibration setting for the leak test machine based on the at least one predictive model and the current environmental data; and test, with the leak test machine using the at least one calibration setting, at least one other workpiece to obtain at least one calibrated defect test result for the at least one other workpiece. The at least one calibration setting compensates for an effect of the at least one current environment condition on the leak test machine.

In at least one embodiment, the at least one sensor can include at least one pressure sensor disposed within one or more seals of the leak test machine.

In at least one embodiment, the method can further involve operating the at least one processor to identify one or more failures within the one or more pressure seals based on pressure measurements obtained from the at least one pressure sensor.

In at least one embodiment, identifying the one or more failures within the one or more pressure seals can involve determining whether at least one pressure measurement obtained from the at least one pressure sensor is below a predetermined pressure threshold.

In at least one embodiment, the at least one sensor can include at least one temperature sensor configured to measure a temperature of at least one of: i.) the leak test machine, or ii.) the workpieces.

In at least one embodiment, the least one temperature sensor can be configured to measure an ambient temperature of air adjacent at least one of: i.) the leak test machine, or ii.) the workpieces.

In at least one embodiment, using the at least one calibration setting by the leak test machine can involve applying an offset to leak rates measured by the leak test machine.

In at least one embodiment, using the at least one calibration by the leak test machine can involve adjusting at least one of: i.) a fill time of the leak test machine, or ii.) a cycle time of the leak test machine.

In at least one embodiment, the method can further involve operating the at least one processor to update the at least one predictive model using workpiece data indicating one or more physical characteristics of the workpieces.

In at least one embodiment, the method can further involve operating the at least one processor to test, with the leak test machine, a plurality of workpieces to obtain the plurality of defect test results, each defect test result obtained while the leak test machine was subject to the corresponding environmental condition.

In at least one embodiment, the method can further involve operating the at least one processor to test, with the leak test machine, a defectless master workpiece to obtain the plurality of defect test results, each defect test result obtained while the leak test machine was subject to the corresponding environmental condition.

In at least one embodiment, testing the at least one other workpiece can involve operating the at least one processor to: test, with the leak test machine using a first calibration setting, a first workpiece to obtain a calibrated defect test result for the first workpiece; and test, with the leak test machine using a second calibration setting, a second workpiece to obtain at least one calibrated defect test result for the second workpiece. The second workpiece can be a different workpiece type than the first workpiece, and the first calibration setting can be different than the first calibration setting.

In at least one embodiment, the method can further involve operating the at least one processor to generate at least a portion of the current environmental data indicating the at least one current environmental condition at the leak test machine using at least one other predictive model.

In another broad aspect, a system for calibrating a leak test machine for a manufacturing line is disclosed herein. The leak test machine is configured to detect leakage defects in workpieces produced by the manufacturing line. The system includes at least one sensor operable to measure environmental conditions at the leak test machine; and at least one processor in communication with the at least one sensor and the leak test machine. The at least one processor is operable to: receive, from the leak test machine, defect data indicating a plurality of defect test results for at least one workpiece; receive, from at least one sensor, environmental data indicating a plurality of environmental conditions at the leak test machine; and update at least one predictive model using the defect data and the environmental data. Each environmental condition corresponds to a defect test result obtained while the leak test machine was subject to that environmental condition. The at least one predictive model is operable to predict a defect test result for a workpiece based on at least one environmental condition at the leak test machine. The at least one processor is further operable to: receive, from the at least one sensor, current environmental data indicating at least one current environmental condition at the leak test machine; determine at least one calibration setting for the leak test machine based on the at least one predictive model and the current environmental data; and transmit the at least one calibration setting to the leak test machine. The at least one calibration setting compensates for an effect of the at least one current environment condition on the leak test machine. The leak test machine is operable to test, using the at least one calibration setting, at least one other workpiece to obtain at least one calibrated defect test result for the at least one other workpiece.

In at least one embodiment, the at least one sensor can include at least one pressure sensor disposed within one or more seals of the leak test machine.

In at least one embodiment, the at least one processor can be operable to identify one or more failures within the one or more pressure seals based on pressure measurements obtained from the at least one pressure sensor.

In at least one embodiment, identifying the one or more failures within the one or more pressure seals can involve determining whether at least one pressure measurement obtained from the at least one pressure sensor is below a predetermined pressure threshold.

In at least one embodiment, the at least one sensor can include at least one temperature sensor configured to measure a temperature of at least one of: i.) the leak test machine, or ii.) the workpieces.

In at least one embodiment, the least one temperature sensor can be configured to measure an ambient temperature of air adjacent at least one of: i.) the leak test machine, or ii.) the workpieces.

In at least one embodiment, using the at least one calibration setting by the leak test machine can involve applying an offset to leak rates measured by the leak test machine.

In at least one embodiment, using the at least one calibration by the leak test machine can involve adjusting at least one of: i.) a fill time of the leak test machine, or ii.) a cycle time of the leak test machine.

In at least one embodiment, the at least one processor can be operable to update the at least one predictive model using workpiece data indicating one or more physical characteristics of the workpieces.

In at least one embodiment, the at least one processor can be operable to: generate at least a portion of the current environmental data indicating the at least one current environmental condition at the leak test machine using at least one other predictive model.

An example non-transitory computer-readable medium including instructions executable on a processor can implementing any one of the methods disclosed herein.

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

BRIEF DESCRIPTION OF THE DRAWINGS

Several embodiments will be described in detail with reference to the drawings, in which.

Figure 1:
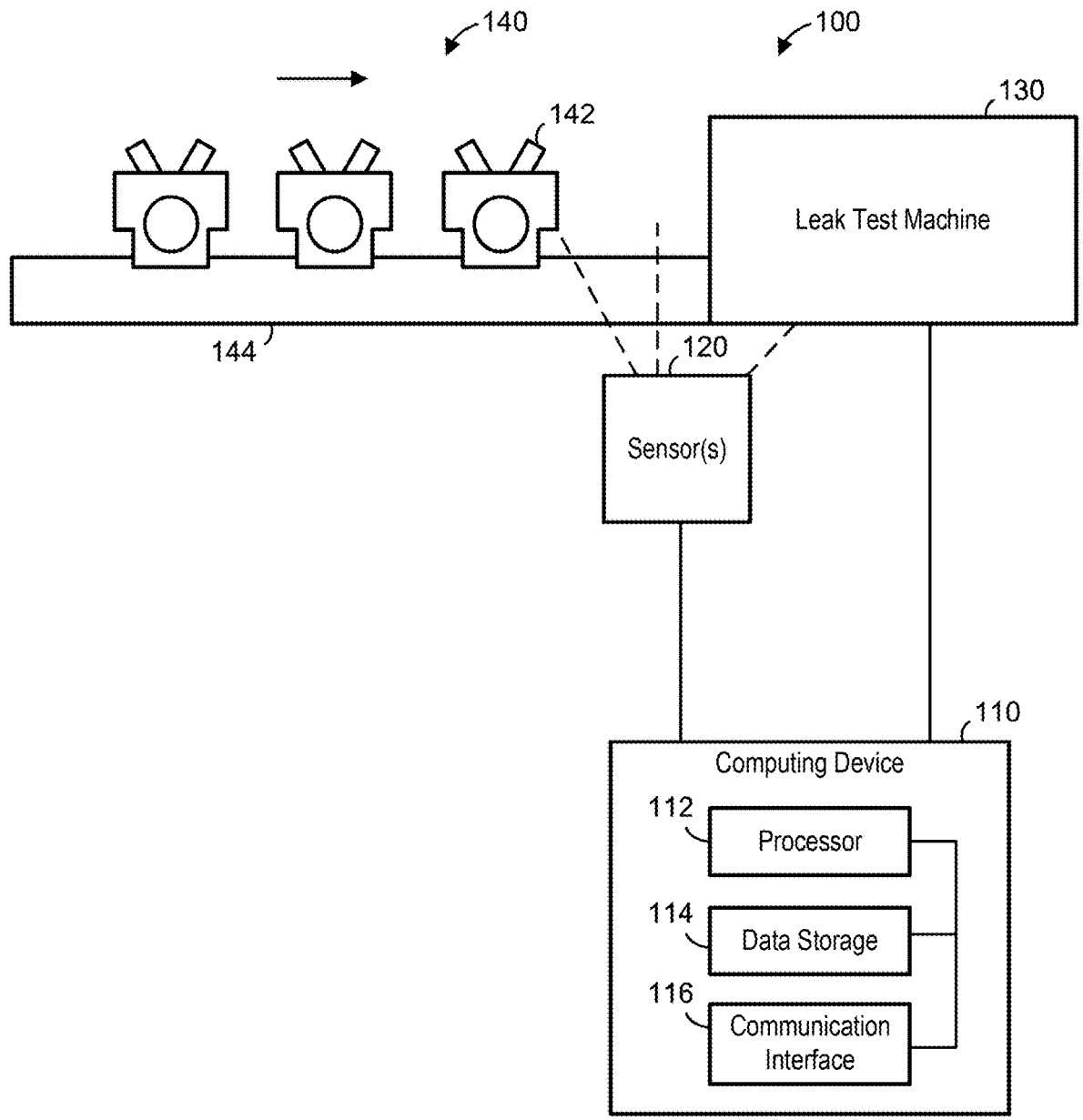
FIG. 1 is a block diagram of an example system for calibrating a leak test machine for a manufacturing line, in accordance with an embodiment.

The drawings, described below, are provided for purposes of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

DESCRIPTION OF EXAMPLE EMBODIMENTS

Various systems or methods will be described below to provide an example of an embodiment of the claimed subject matter. No embodiment described below limits any claimed subject matter and any claimed subject matter may cover methods or systems that differ from those described below. The claimed subject matter is not limited to systems or methods having all of the features of any one system or method described below or to features common to multiple or all of the apparatuses or methods described below. It is possible that a system or method described below is not an embodiment that is recited in any claimed subject matter. Any subject matter disclosed in a system or method described below that is not claimed in this document may be the subject matter of another protective instrument, for example, a continuing patent application, and the applicants, inventors or owners do not intend to abandon, disclaim or dedicate to the public any such subject matter by its disclosure in this document.

Referring now to FIG. 1, there is shown an example system 100 for calibrating a leak test machine 130 for a manufacturing line 140. As shown, the calibration system 100 can include at least one sensor 120 and a computing device 110.

The manufacturing line 140 can be any type of production or assembly line for manufacturing, producing, or processing workpieces 142. For example, the manufacturing line 140 can be configured to produce engine parts, medical devices, electronics, or any other articles. Generally, the manufacturing line 140 can include one or more subsections or stations (not shown) that are spaced along the manufacturing line 140 and configured to perform specific processing tasks on the workpieces 142. During operation, the workpieces 142 can be transported along the manufacturing line 140 and successively processed by various stations until a finished article is produced. As shown, the manufacturing line 140 may include a conveying mechanism 144 operable to transport the workpieces 142 along the manufacturing line 140, such as a conveyor. The particular arrangement and configuration of the manufacturing line 140 can depend on the type of the workpiece 142 being manufactured, produced, or processed.

The leak test machine 130 can be configured to detect leakage defects in the workpieces 142 handled by the manufacturing line 140. The leakage defects can include any imperfections or manufacturing defects in the workpieces 142 which permit liquids or gases to escape or be released from the workpieces 142 in an undesired manner. For instance, in the illustrated example, the leakage defects may include one or more unintended cracks, holes, or other unsealed portions in the cylinder block, head, or valve bodies of the workpieces 142. Leakage defects may also include component misalignment and material weaknesses.

The leak test machine 130 can be positioned anywhere in the manufacturing line 140. In the illustrated example, the leak test machine 130 is positioned at the end of the manufacturing line 140 and is configured to detect leakage defects in finished articles. However, in other embodiments, the leak test machine 130 may be positioned at an intermediate stage of the manufacturing line 140 to detect leakage defects in unfinished articles. In some embodiments, the manufacturing line 140 may include more than one leak test machine 130 to detect leakage defects in the workpieces 142 at various stages of the manufacturing process. In some embodiments, the leak test machine 130 may be remotely located from the manufacturing line 140, for example, in a separate or segregated area of the manufacturing facility, where selective or exhaustive quality testing may be performed.

The leak test machine 130 can employ pressure to cause and detect the release or escape of liquid or gas from a workpiece 142. Since leaks flow from high pressure to low pressure, the leak test machine 130 can pressurize the workpiece 142, and then detect the presence of unexpected fluid flow from the workpiece 142. The leak test machine 130 may employ any suitable type of leak testing to detect leakage defects. In some embodiments, the leak test machine 130 may measure the decay of an internal pressure of the workpiece 142. In other embodiments, the leak test machine 130 may measure fluid flow through ports of the workpiece 142 to determine whether the flow is within an expected range. In some embodiments, the leak test machine 130 may measure deformation or physical dimensions. For example, the leak test machine 130 may measure the physical dimension change of a workpiece 142 or an associated workpiece holder.

Referring back to FIG. 1, the leak test machine 130 can generate defect test results indicating the outcome of leak tests on the workpieces 142. Each defect test result may indicate a measurement for a particular workpiece 142. For example, each defect test result may indicate a leak rate for a particular workpiece 142 measured by the leak test machine 130. The leak rate may correspond to a fluid flow rate (e.g., volume/time) into or out of the workpiece 142, change in internal pressure of the workpiece 142 (e.g., pressure/time), or deformation of the workpiece (e.g., position/time), measured by the leak test machine 130. Additionally, or alternatively, each leak test result may indicate whether a particular workpiece 142 passed or failed the leak test. The leak test machine 130 can transmit leak test results to the computing device 110.

Figure 5A:
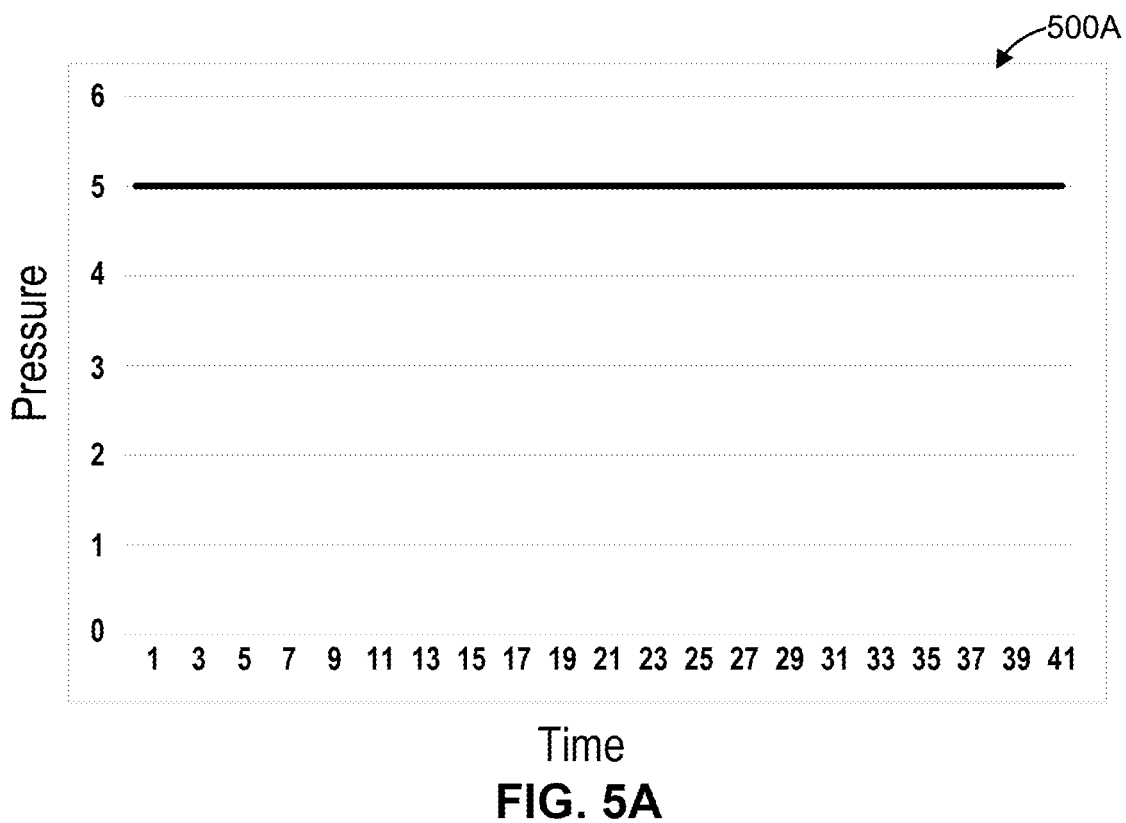
FIG. 5A is a graph illustrating an example of leak test pressure data.
Figure 5B:
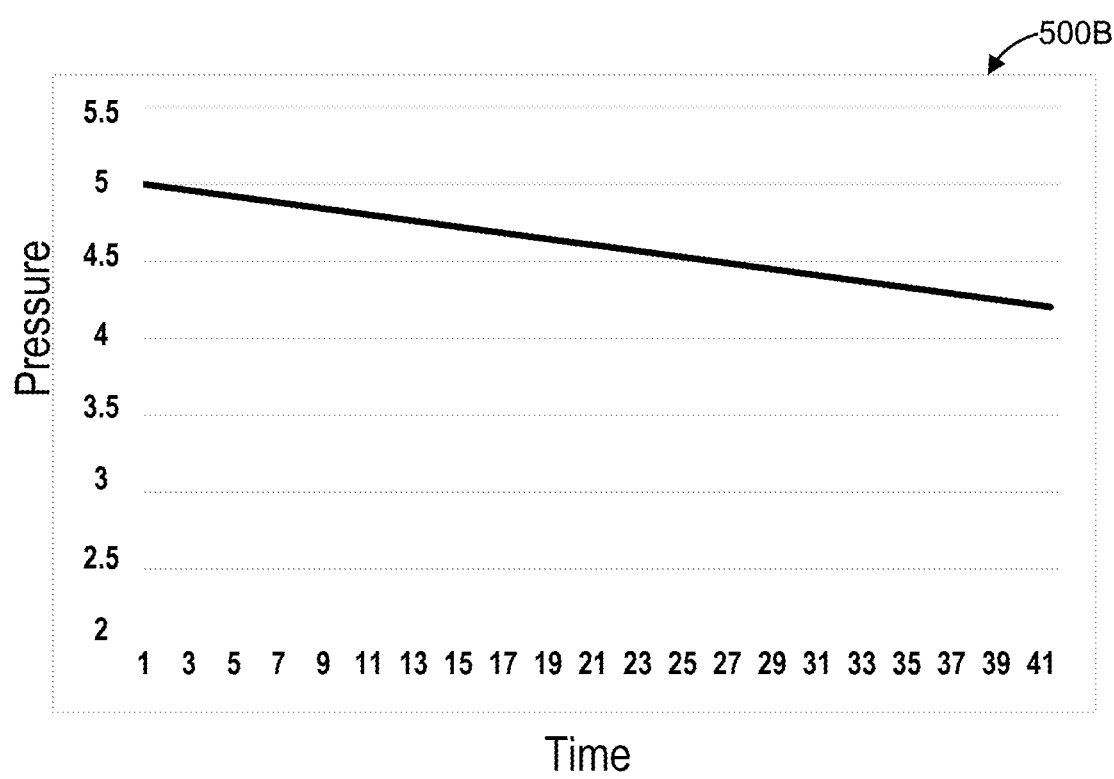
FIG. 5B is a graph illustrating another example of leak test pressure data.
Figure 5C:
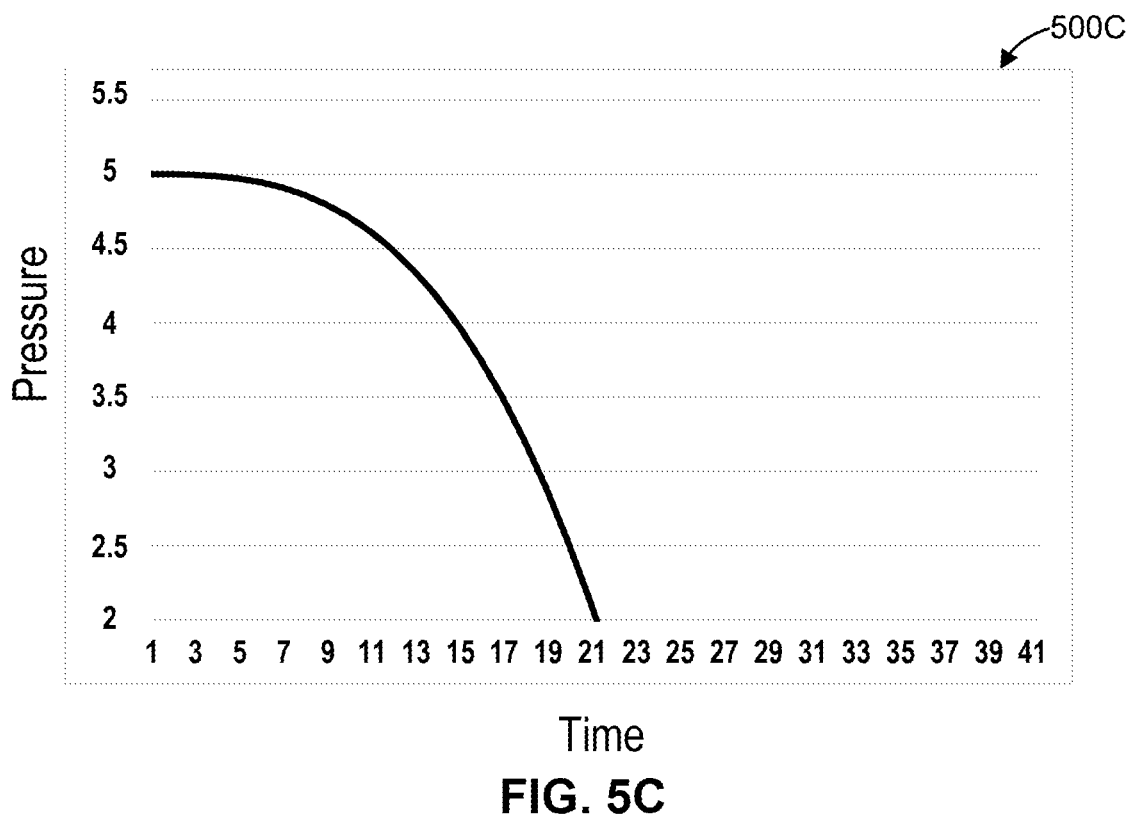
FIG. 5C is a graph illustrating another example of leak test pressure data.
Figure 5D:
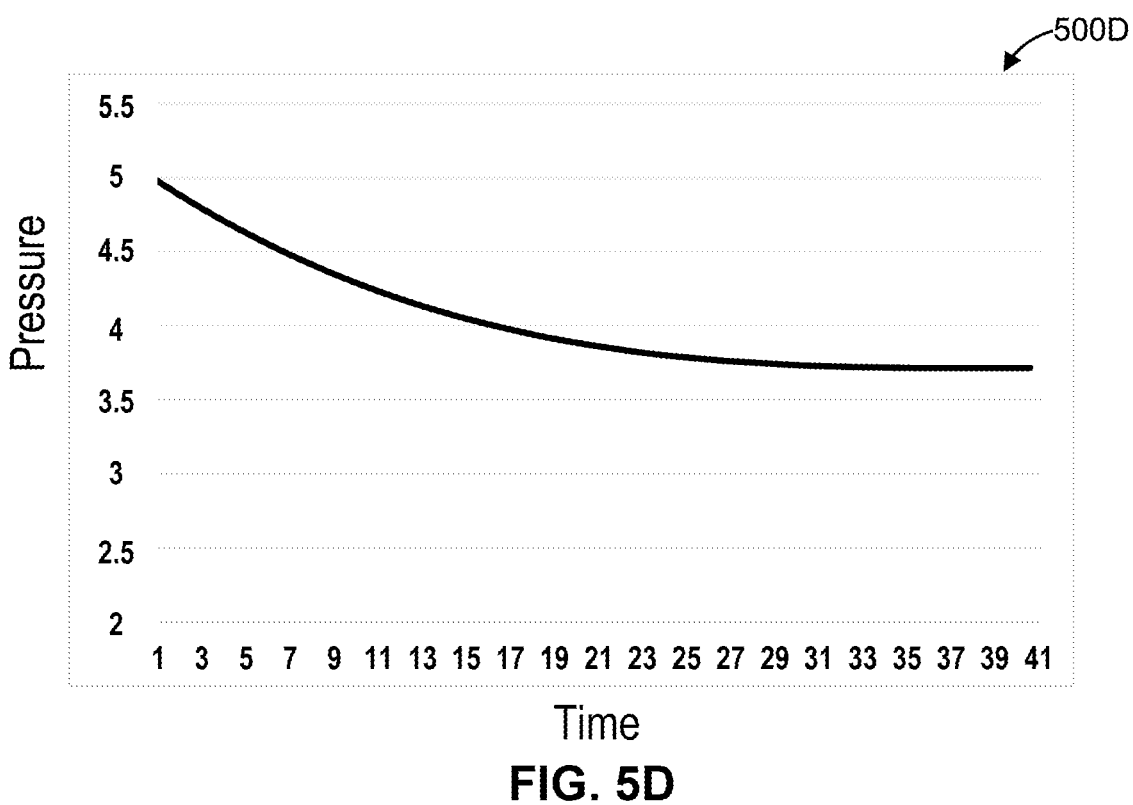
FIG. 5D is a graph illustrating another example of leak test pressure data.

Example leak test data that can be generated by the leak test machine 130 is shown in FIG. 5A to FIG. 5F. In FIG. 5A, graph 500A illustrates an example where the measured pressure does not change over time, indicating no leakage in the workpiece 142. In FIG. 5B, graph 500B illustrates an example where the measured pressure linearly decreases over time, indicating some potential leakage in the workpiece 142. While a linear decrease is shown in graph 500B, it will be understood that other decreases may be exhibited. For example, graph 500C in FIG. 5C and graph 500D in FIG. 5D illustrate examples where the measured pressure decreases non-linearly over time, again indicating some potential leakage in the workpiece 142. In graph 500C, the pressure decreases at an exponentially increasing rate while in graph 500D, the pressure decreases at an exponentially decreasing rate.

Figure 5E:
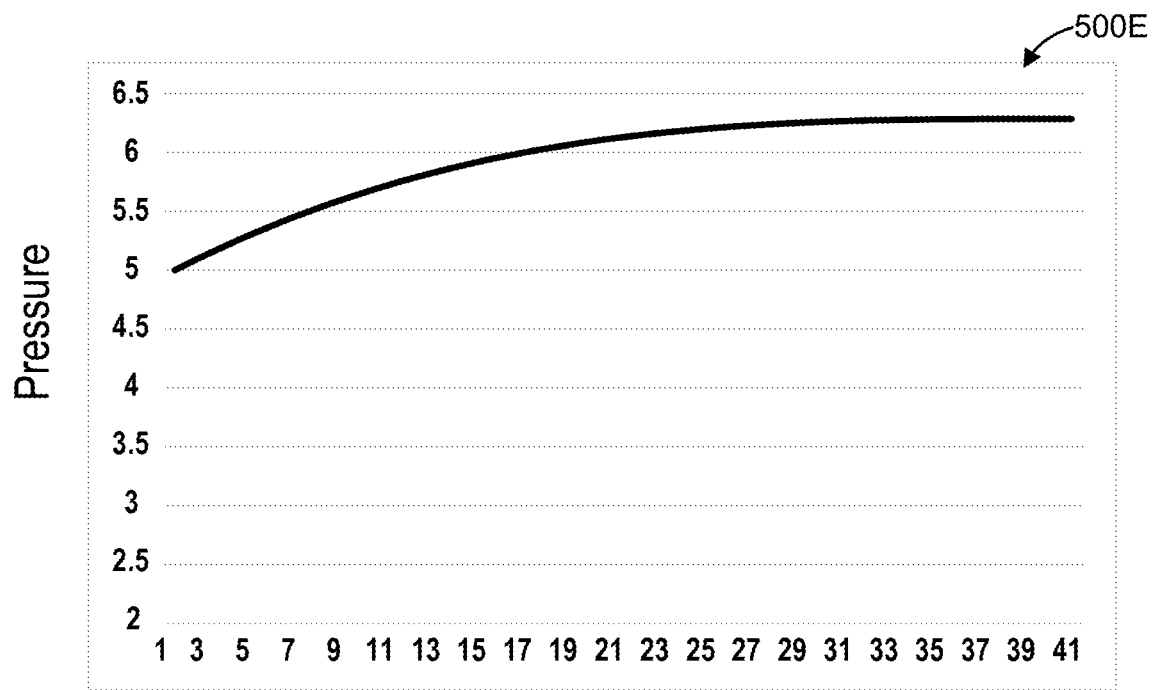
FIG. 5E is a graph illustrating another example of leak test pressure data.

In FIG. 5E, graph 500E illustrates an example where the measured pressure exponentially increases over time with liquid or gas temperature change. This may be caused by the temperature of the workpiece 142 increasing, increasing the internal pressure of the workpiece 142. This could potentially hide leaks in the workpiece 142 from being detected by the leak test machine 130. While an exponential increase is shown in graph 500E, it will be understood that other increases may be exhibited, such as but not limited to a linear decrease or other non-linear decreases.

Figure 5F:
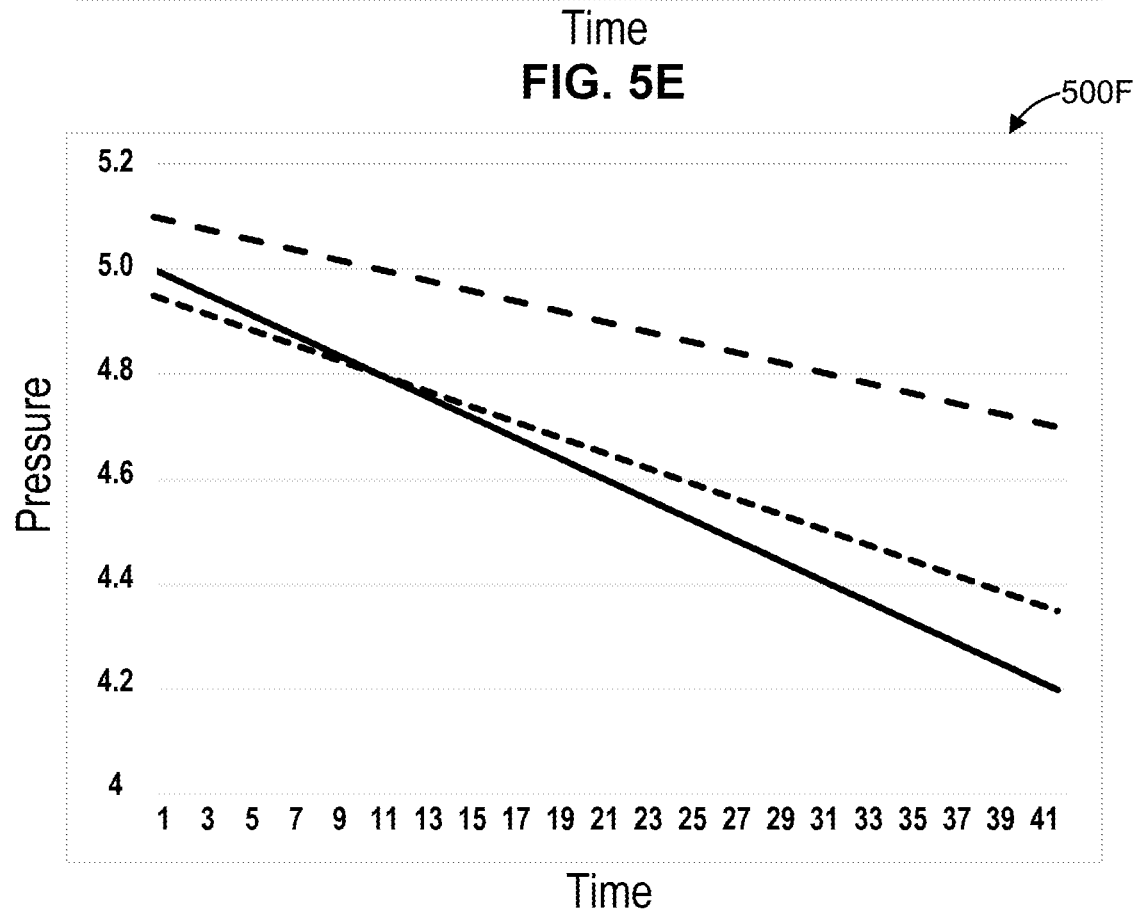
FIG. 5F is a graph illustrating another example of leak test pressure data.

In FIG. 5F, graph 500F illustrates an example where the measured pressure decreases over time for three different leak tests of the same workpiece 142. A workpiece 142 can undergo multiple tests, such as that shown in graph 500F, to calibrate the leak test machine (e.g., environmental conditions and sensor calibration). As shown in graph 500F, small changes in testing conditions can affect the collected data for the same workpiece 142.

Referring back to FIG. 1, the leak test machine 130 may require calibration to generate accurate leak test results. Various settings of the leak test machine 130 can be adjusted to calibrate the leak test results. For example, some calibration settings may be used to adjust the conversion from raw sensor data into leak rates. Other calibration settings may be used to adjust the fill or cycle time of the leak tests. However, the relationship between the calibration settings and the accuracy of the leak test results may not be straightforward. As a result, existing calibration methods typically rely on the skill and judgement of experienced manufacturing line operators. Such calibrations may require adjustments due to changes in the leak test machine 130 or testing environment.

Various environmental conditions at the leak test machine 130 may affect the defect test results and the calibration of the leak test machine 130. For example, changes in temperature may cause thermal expansion or contraction of components of the leak test machine 130 or the workpieces 142. Furthermore, thermal expansion or contraction can vary between different components. Changes in temperature may also affect the internal pressure within the workpieces 142 or the pressure generated by the leak test machine 130. For example, changes in temperature may change the volume, viscosity, or characteristics of the measured gas or fluid. Likewise, changes in humidity or atmospheric pressure may cause also affect the performance of the leak test machine 130. The leak test machine 130 may be highly sensitive to changes in environmental conditions. That is, small changes in environmental conditions may require large changes in the calibration of the leak test machine 130. Furthermore, environmental conditions at the leak test machine 130 may rapidly change as a result of the dynamic nature of the manufacturing facility. It may be difficult for even an experienced manufacturing line operator to calibrate the leak test machine 130 in response to changing environmental conditions, especially when the changes are rapid. A manufacturing line operator may not know how to account for the effect of particular environmental conditions on the leak test machine 130, or may not be able to manually reconfigure the leak test machine 130 in a timely manner. For example, large changes may be caused by cooling of the workpiece 142.

Improper calibration of the leak test machine 130 may cause inaccurate detection of leakage defects in the workpieces 142 and therefore inaccurate defect test results. For example, the leak test machine 130 may detect false defects in defectless workpieces, or fail to detect actual defects in defective workpieces. As a result, some defectless workpieces may be scrapped, while some defective workpieces may be not be detected as reject. Furthermore, some workpieces may require retesting, extending testing time and manufacturing costs. Workpieces that require retesting can be re-tested using the same leak test machine 130 or re-routed to another leak test machine 130. Retesting with the same leak test machine 130 can involve a complete retest or a partial retest, such as extending the leak test cycle or repressurizing the device. When another leak test machine 130 is used for the retest, the other leak test machine 130 can employ the same testing method or a different testing method as the initial test. Each of these types of detection errors may result in increased production costs for the manufacturing line 140.

The calibration system 100 can be used to automatically calibrate the leak test machine 130 based on current environmental conditions at the leak test machine 130. In this manner, the calibration system 100 can improve the operation of the leak test machine 130, and the overall manufacturing line 140, as compared to existing manual calibration methods. The calibration system 100 can employ various computer-implemented artificial intelligence or machine learning methods to model the behavior of the leak test machine 130 to determine calibration settings. This may allow the calibration system 100 to calibrate the leak test machine 130 in response to rapid and complex changes in environmental conditions in real time, in a manner that could not be accomplished manually by manufacturing line operators. The calibration system 100 may allow the leak test machine 130 to detect leak conditions with less cycling and monitoring time, increasing the throughput of the manufacturing line 130. As shown, the calibration system 100 can include at least one sensor 120 and a computing device 110. In general, the at least one sensor 120 can measure environmental conditions at the leak test machine 130, and the computing device 110 can adjust the calibration settings of the leak test machine 130 based on the measured environmental conditions.

The at least one sensor 120 can measure one or more environmental conditions at the leak test machine 130. Various types of sensors 120 can be used to measure various types of environmental conditions. For example, the environmental conditions may include temperature, pressure, humidity, vibration, and the like. As shown, the environmental conditions can be measured by measuring various characteristics of the leak test machine 130, the workpieces 142 and/or the surroundings thereof. The sensors 120 can transmit the measured environmental conditions to the computing device 110. In some embodiments, the sensors 120 may include dimension sensors for measuring the dimensions of the workpiece 142 or a holder for the workpiece 142.

In some embodiments, the at least one sensor 120 may include one or more temperature sensors. The one or more temperature sensors can measure the temperature of the leak test machine 130 and/or the workpieces 142. Additionally or alternatively, the one or more temperature sensors can measure the ambient temperature of the air adjacent the leak test machine 130 and/or the workpieces 142. Various types of temperature sensors may be used. For example, the temperature sensors may be provided by thermistors, thermocouples, resistance thermometers, and the like.

In some embodiments, the sensors 120 may include one or more pressure sensors. The pressure sensors can measure a pressure of the leak test machine 130 and/or the workpieces 142. For example, the pressure sensors may measure the pressure applied by the leak test machine 130 and/or the internal pressure of the workpieces 142. Additionally, or alternatively, the pressure sensors may measure the ambient atmospheric pressure of the manufacturing facility. Various types of pressure sensors may be used. For example, the pressure sensors may be strain gauges, capacitive sensors, electromagnetic sensors, piezoelectric sensors, optical sensors, and the like.

In some embodiments, one or more pressure sensors may be disposed within one or more pressure seals of the leak test machine 130. The pressure seals of the leak test machine 130 are generally operable to seal portions of the leak test machine 130 so that the leak test machine 130 can maintain pressure during leak testing. Degradation in the pressure seals can cause inaccuracies in the defect test results, for example, as the loss of pressure may be falsely detected as a leak. However, it can be difficult to identify which of the pressure seals have degraded. The pressure sensors disposed in the pressure seals may be used detect failures in the pressure seals, as will be described with reference to FIG. 4.

In some embodiments, the pressure sensors can be inserted into the pressure seals during the construction of the pressure seals. For example, the pressure sensors may be embedded into the pressure seals during an additive manufacturing process, such as 3D printing.

Although only a single sensor 120 is shown in the illustrated example, it should be appreciated that there can be any number of sensors 120. Furthermore, it should be appreciated that the sensors 120 can be positioned at various locations. As shown, the sensors 120 may disposed remotely from the workpieces 142 and/or the leak test machine 130. For example, the sensors 120 may include one or more contactless sensors. In other embodiments, the sensors 120 may be located at the leak test machine 130 and/or the workpieces 142.

The computing device 110 can communicate with the leak test machine 130 and the at least one sensor 120. For example, the computing device 110 can receive defect test results from the leak test machine 130 and environmental conditions from the at least one sensor 120. The computing device 110 can also determine calibration settings for the leak test machine 130 and transmit the calibration settings to the leak test machine 130. The computing device 110 can use various artificial intelligence or machine learning methods to determine the calibration settings, as will be described with reference to FIGS. 3 and 4.

In some embodiments, there may be a plurality of leak test machines 130 and sensors 120, and the computing device 110 can communicate with each of the leak test machines 130 and sensors 120 over a network. In this manner, the computing device 110 can perform the various calibration methods described herein on the plurality of leak test machines 130. The network may be any network capable of carrying data, including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these, capable of interfacing with, and enabling communication between, the various components of the calibration system 100.

The computing device 110 can generally be implemented using hardware or a combination of hardware and software. For example, the computing device 110 may be implemented using an electronic tablet device, a personal computer, workstation, server, portable computer, mobile device, personal digital assistant, laptop, smart phone, WAP phone, PLC (programmable logic controller), industrial controller, microcontroller, or any combination of these. In some embodiments, the computing device 110 may be provided by two or more computers distributed over a wide geographic area and connected through a network. As shown, the computing device 110 can include a processor 112, a data storage 114, and a communication interface 116. Each of these components may be divided into additional components or combined into fewer components. In some cases, one or more of the components may be distributed over a wide geographic area.

The processor 112 can be implemented with any suitable processor, controller, digital signal processor, graphics processing unit, application specific integrated circuits (ASICs), and/or field programmable gate arrays (FPGAs) that can provide sufficient processing power for the configuration, purposes and requirements of the calibration system 100. The processor 112 can include more than one processor with each processor being configured to perform different dedicated tasks. The processor 112 can execute various instructions stored in the data storage 114 to implement the various calibration methods described herein.

The data storage 114 can include RAM, ROM, one or more hard drives, one or more solid state drives (SSD), one or more flash drives or some other suitable data storage elements such as disk drives. The data storage 114 can store various data collected from the sensors 120 and/or the leak test machine 130. The data storage 114 can also store instructions that can be executed by the processor 112 to implement the various calibration methods described herein. In some embodiments, the data storage 114 may more than one data storage component. For example, the data storage 114 may include a local data storage located at the computing device 110 and an external data storage that is remote from the local data storage and connected to the computing device 110 over a network.

The communication interface 116 can include any interface that enables the computing device 110 to communicate with various devices and other systems. The communication interface 116 can include at least one of a serial port, a parallel port or a USB port, in some embodiments. The communication interface 116 may also include an interface to a component via one or more of a Bluetooth, WIFI, Internet, Local Area Network (LAN), Ethernet, Firewire, modem, fiber, industrial network, Profibus®, ProfiNet®, OPC, DeviceNet®, EtherCAT®, Modbus®, or digital subscriber line connection. Various combinations of these elements may be incorporated within the communication interface 116. The communication interface 116 can be used to communicate with the leak test machine 130 and/or the sensors 120, for example, to receive defect test results and environmental conditions.

Figure 2:
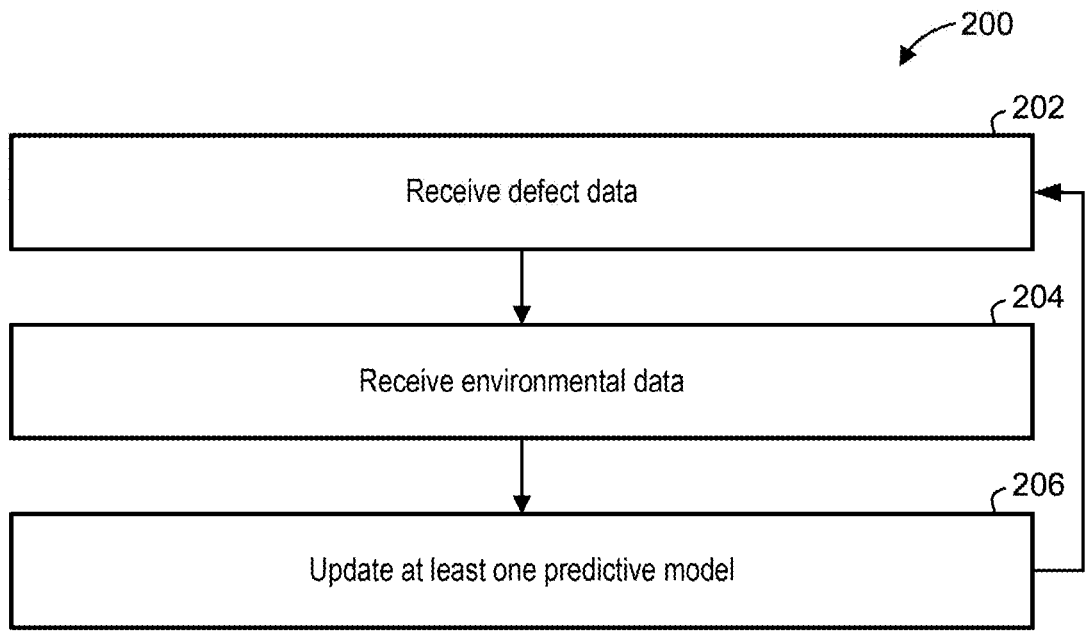
FIG. 2 is flowchart of an example method of operating the calibration system shown in FIG. 1, in accordance with an embodiment.

Referring now to FIG. 2, there is shown an example method 200 for operating the calibration system 100. The method 200 can be used to update predictive models for predicting defect test results of the leak test machine 130 based on environmental conditions at the leak test machine 130. The environmental conditions can include conditions associated with the workpieces 142, the leak test machine 130, and/or sensors of the leak test machine 130.

At 202, defect data can be received from the leak test machine 130. For example, the processor 112 of the computing device 110 can receive defect data from the leak test machine 130 through the communication interface 116 and store the defect data in the data storage 114. The defect data can include a plurality of defect test results for one or more workpieces 142. For example, each defect test result may indicate a leak rate measured by the leak test machine 130 for a particular workpiece 142. The leak rate may correspond to a fluid flow rate (e.g., volume/time) into or out of the workpiece 142 measured by the leak test machine 130. Additionally, or alternatively, each defect test result main indicate whether a particular workpiece passed or failed the leak test executed by the leak test machine 130.

In some embodiments, the defect data may include defect test results for a plurality of different workpieces 142. For example, the defect data may be collected during normal operation of the manufacturing line 140, as multiple workpieces 142 are produced by the manufacturing line 140. In other embodiments, the defect data may include a plurality of defect test results for a single workpiece 142. For example, the defect test results may be collected from a single defectless master workpiece under different environmental conditions. Because the master workpiece is free of defects, the defect data for the master workpiece may be a better representation of the effect of environmental conditions on the defect test results (e.g., independent of the effects of defects). The defect data for the master workpiece can also provide data relating to the sensors of the leak test machine 130 (e.g., offset or calibration data) or the workpieces 142 (e.g., temperature conditions).

At 204, environmental data can be received from the sensors 120. For example, the processor 112 of the computing device 110 can receive the environmental data from the sensors 120 through the communication interface 116 and store the environmental data in the data storage 114. The environmental data can indicate a plurality of environmental conditions measured by the sensors 120. The plurality of environmental conditions can correspond to the defect test results received at 202. For example, each environmental condition can correspond to a defect test result obtained while the leak test machine 130 was subject to that environmental condition.

In some embodiments, the plurality of environmental conditions may include a single environmental condition for each defect test result. For example, the environmental data may include, for each defect test result, the ambient temperature of the facility when the defect test result was obtained. In other embodiments, the plurality of environmental conditions may include more than one environmental condition for each defect test result. For example, the environmental data may include, for each defect test result, the ambient temperature of the facility and the temperature of the workpiece 142 when the defect test result was obtained.

At 206, at least one predictive model can be updated using the defect data and the environmental data obtained at 202 and 204. The predictive models can be used to predict defect test results based on environmental conditions at the leak test machine 130. The predictive models can include any suitable machine learning or artificial intelligence models that are trained to make such predictions. Various types of training methods may be used to produce the predictive models, such as support vector machines, linear regression, logistic regression, naïve Bayes, linear discriminant analysis, decision trees, k-nearest neighbor algorithms, neural networks, similarity learning, polynomials with ridge estimators, polynomial with linear estimators, and the like. For example, the processor 112 may update the at least one predictive model using the defect data and environmental data stored at the data storage 114.

In some embodiments, updating the predictive models may involve training or further training predictive models using the defect and environmental data. For example, this may involve performing additional training or re-training existing models that were previously generated using other data. For example, the existing models may be one or more general or non-specific models that were generated using data collected from one or more other manufacturing lines. Alternatively, the one or more existing models may have been generated based on various physical characteristics of the leak test machine 130 or the workpieces 142. The existing models can be updated using the defect and environmental data to be more specific to the manufacturing line 140 and improve the accuracy of the existing models.

In some embodiments, the predictive models can be updated using workpiece data. The workpiece data can indicate one or more physical characteristics of the workpieces 142. For example, the workpiece data may include size, shape, weight, material properties, and the like.

In some embodiments, the predictive models can be updated using various calibration settings for the leak test machine 130. In this manner, the predictive models may be trained to predict the effect of the calibration settings on the defect test results.

As shown, subsequent to 206, acts 202, 204, and 206 can be executed again, so that the method 200 can be repeated. In this manner, the predictive models for the leak test machine 130 can be continuously updated using new data from the leak test machine 130 and the sensors 120. This can improve the accuracy of the predictive models over time as additional data specific to the manufacturing line 140 is collected and used to update the predictive models.

Figure 3:
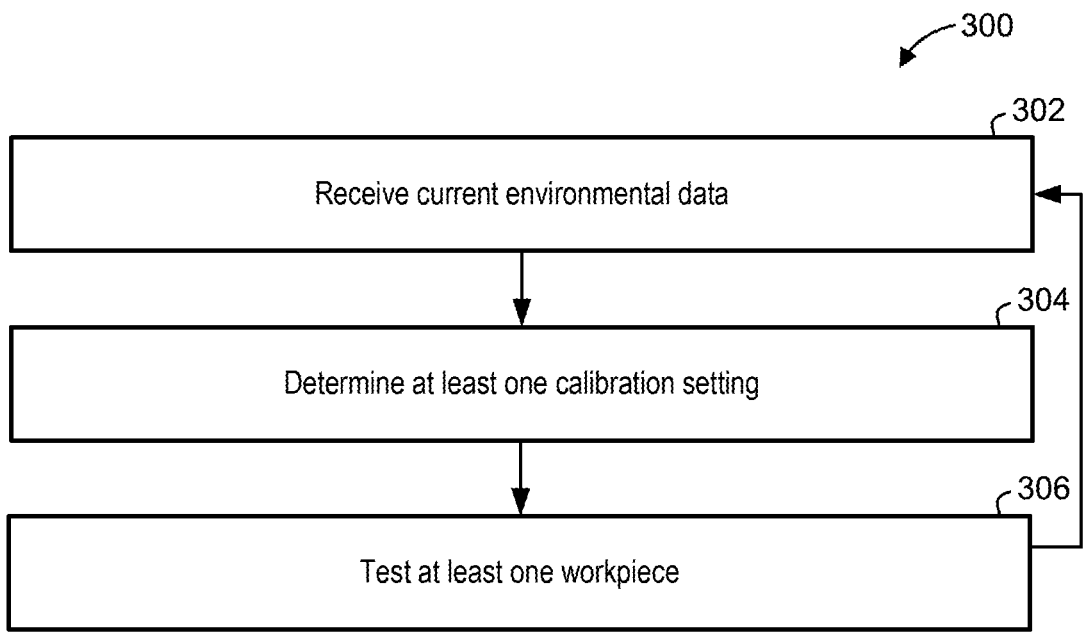
FIG. 3 is flowchart of another example method of operating the calibration system shown in FIG. 1, in accordance with an embodiment.

Referring now to FIG. 3, there is shown another example method 300 for operating the calibration system 100. The method 300 can be used to calibrate the leak test machine 130 based current environmental conditions at the leak test machine 130 using predictive models.

At 302, current environmental data can be received from the sensors 120. For example, the processor 112 of the computing device 110 can receive the current environmental data from the sensors 120 through the communication interface 116 and store the current environmental data in the data storage 114. The current environmental data can indicate one or more current environmental conditions at the leak test machine 130 measured by the at least one sensor 120.

In some embodiments, current environmental data may be generated using simulations or modeling. For example, the current environmental data may be generated using at least one other predictive model. Various types of artificial intelligence (AI) or machine-learned models may be used, such as support vector machines, linear regression, logistic regression, naïve Bayes, linear discriminant analysis, decision trees, k-nearest neighbor algorithms, neural networks, similarity learning, polynomials with ridge estimators, polynomial with linear estimators, and the like. In this manner, the calibration system 100 may calibrate the leak test machine 130 using conditions different from the actual conditions at the leak test machine 130. Instead, the calibration system 100 may calibrate the leak test machine 130 based on conditions that the workpieces 142 may experience during use. For example, a predictive model for a motor may be used to predict temperatures for the motor during operation, for instance based on the current applied to the motor. The operational temperatures of the motor, as predicted by a model, may be used to calibrate the leak test machine 130, instead of the conditions in the manufacturing facility.

Figure 6A:
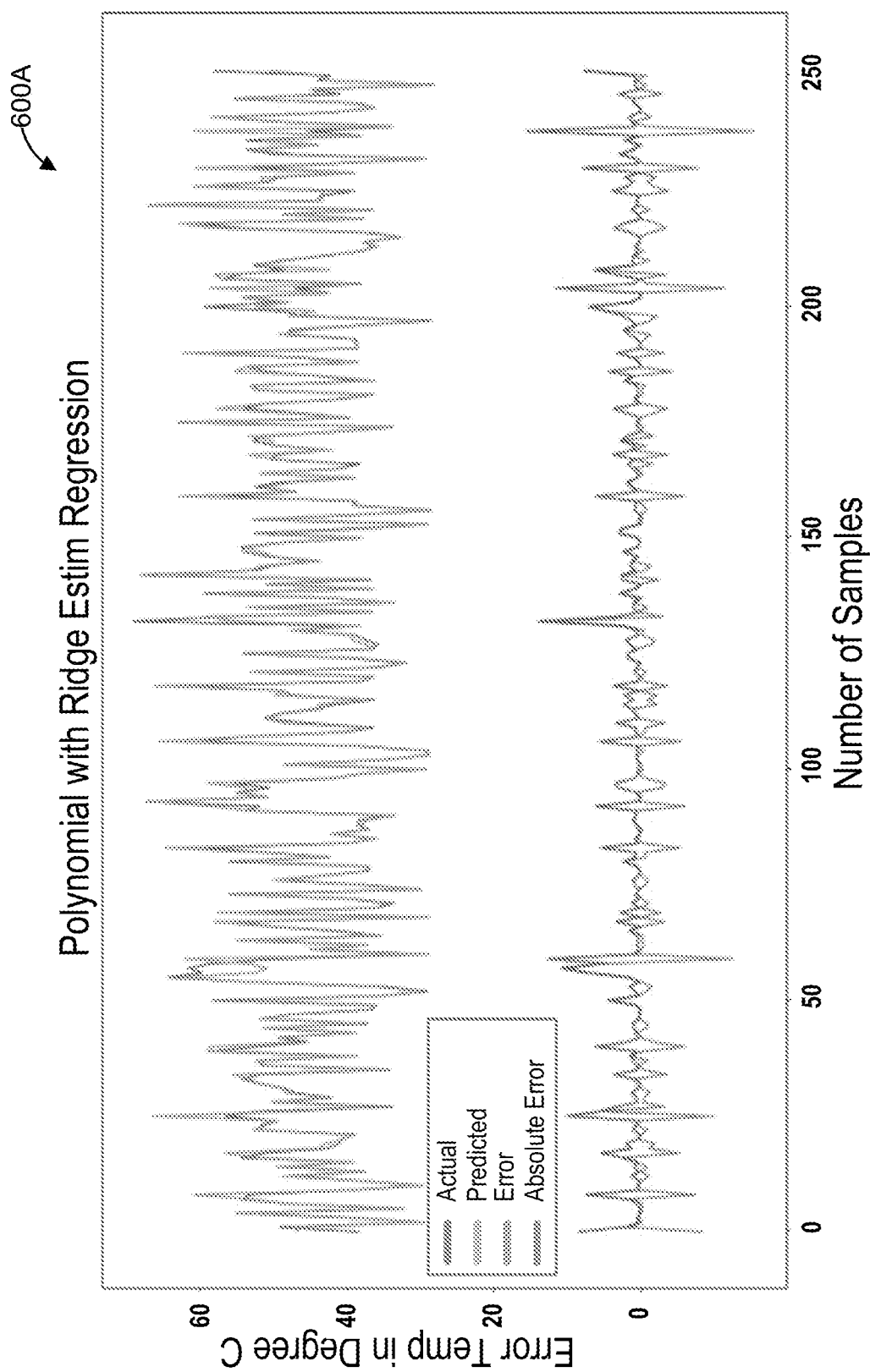
FIG. 6A is a graph illustrating an example of workpiece temperature data.
Figure 6B:
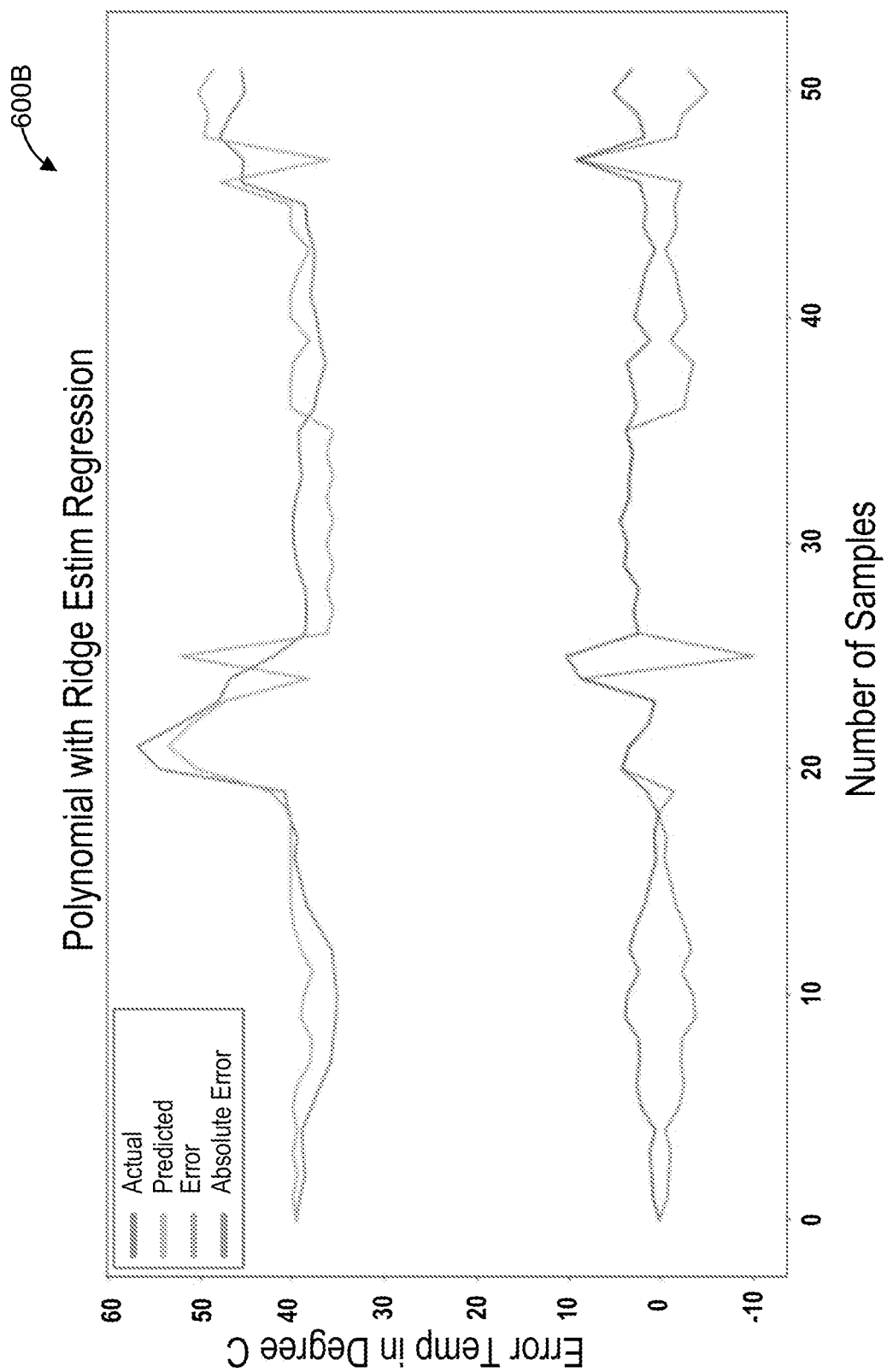
FIG. 6B is a graph illustrating another example of workpiece temperature data.

FIG. 6A shows graph 600A illustrating example workpiece temperature data collected using environmental sensors 120. FIG. 6B shows graph 600B illustrating example workpiece temperature data generated using predictive models. As shown, the error between the measured temperature data of 600A and predicted temperature data of 600B is very small, demonstrating that the predicted temperature data is accurate and could be used as a substitute for the measured temperature data. In some embodiments, predicted temperature data can supplement measured temperature data. That is, a portion of the temperature data can be predicted.

At 304, at least one calibration setting for the leak test machine 130 can be determined. The calibration settings can be used to compensate for the effect of the current environmental conditions on the leak test machine 130. The calibration settings can be determined using one or more predictive models and the current environmental data. As described herein with respect to FIG. 3, the predictive models can be artificial intelligence or machine learning models trained to predict defect test results based on environmental conditions at the leak test machine 130. The predictive models can be used to determine the effect of environmental conditions on defect test results. For example, the predictive models may be used to determine the difference between defect test results for a workpiece 142 under current environmental conditions and defect test results for the same workpiece 142 under ideal environmental conditions. Various calibration settings can be determined based on the predictive models.

In some embodiments, the calibration settings may include a leak rate offset. The leak rate offset can be used to adjust leak rates of the workpieces 142 measured by the leak test machine 130. The leak rate offset can compensate for the effect of current environmental conditions on the leak test machine 130. For example, an increase in temperature at the leak test machine 130 may cause thermal expansion, increasing the leak rates measured by the leak test machine 130. The leak rate offset can be used to decrease the measured leak rates to compensate for the effect of the increased temperature. The leak rate offset can be determined using one or more of the predictive models. For example, the predictive models can be used to determine a change in leak rate as a result of one or more environmental conditions at the leak test machine 130.

In some embodiments, the at least one calibration setting may include a fill time adjustment. The fill time adjustment can be used to adjust the amount of time spent to pressurize a workpiece 142 during a leak test. The fill time adjustment can also compensate for the effect of the current environmental conditions on the leak test machine 130. For example, an increase in temperature at the leak test machine 130 may require a longer fill time to allow a workpiece 142 to thermally stabilize to produce accurate defect test results. The fill time adjustment can be used to increase the fill time in a manner that maximizes the throughput of the leak test machine 130, while maintaining a suitable leak test accuracy. The fill time adjustment can be determined using one or more of the predictive models. For example, the predictive models can be used to determine a change in leak rate as a result of the fill time and the one or more environmental conditions at the leak test machine 130.

In some embodiments, the at least one calibration setting may include a cycle time adjustment. The cycle time adjustment can be used to adjust the overall amount of time used for the conduct a leak test on a particular workpiece 142. The cycle time adjustment can also compensate for the effect of the current environmental conditions on the leak test machine 130. For example, a sudden increase in temperature at the leak test machine 130 may require a longer fill time or measurement time to allow a workpiece 142 to thermally stabilize to produce accurate defect test results. The cycle time adjustment can be used to increase the overall amount of time spent on a leak test in a manner that maximizes the throughput of the leak test machine 130, while maintaining a suitable leak test accuracy. The cycle time adjustment can be determined using one or more of the predictive models. For example, the predictive models can be used to determine a change in leak rate as a result of the cycle time and the one or more environmental conditions at the leak test machine 130.

At 306, at least one workpiece 142 can be tested using the at least one calibration setting to obtain at least one calibrated test result. For example, the processor 112 of the computing device 110 can transmit calibration settings to the leak test machine 130 through the communication interface 116. The leak test machine 130 can use the calibration settings to test the at least one workpiece 142. The workpieces 142 tested at 306 may be different than the workpieces 142 used to collect the training data for the predictive models. The calibrations setting can compensate for the effect of the current environmental conditions at the leak test machine 130. For example, the leak test machine 130 may use a leak rate offset to adjust the measured leak rates. As another example, the leak test machine 130 may use a fill or cycle time adjustment to adjust the fill or cycle times.

In some embodiments, more than one type of workpiece can be tested at 306. For example, a first type of workpiece may be tested using a first calibration setting, and a second different type of workpiece may be tested using a second different calibration setting. Each type of workpiece may be associated with different predictive models and different calibration settings. For example, there may be different predictive models and calibration settings for engine bodies, as compared to engine valves.

As shown, subsequent to 306, acts 302, 304, and 306 can be executed again, so that the method 300 can be repeated. In this manner, the calibration of the leak test machine 130 can be continuously updated as environmental conditions at the leak test machine 130 change during operation of the manufacturing line 140.

Figure 4:
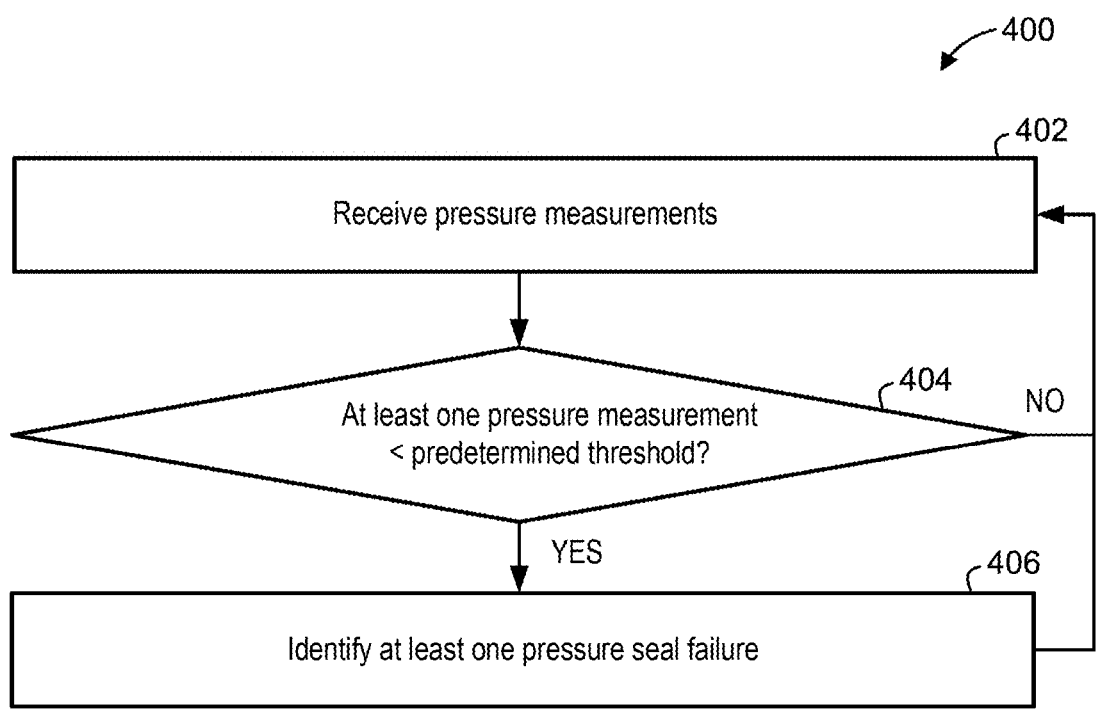
FIG. 4 is flowchart of another example method of operating the calibration system shown in FIG. 1, in accordance with an embodiment

Referring now to FIG. 4, there is shown another example method 400 for operating the calibration system 100. The method 400 can be used to identify failures in the pressure seals of the leak test machine 130.

At 402, pressure measurements can be received from one or more pressure sensors disposed in one or more seals of the leak test machine 130. For example, the processor 112 of the computing device 110 can receive the pressure measurements from the sensors 120 through the communication interface 116 and store the pressure measurements in the data storage 114.

At 404, it can be determined whether one or more of the pressure measurements is below a predetermined pressure threshold. For example, the processor 112 may determine whether at least one pressure measurement obtained from the sensors 120 at 402 is below a predetermined pressure threshold. The predetermined pressure threshold can correspond to a pressure exerted on the pressure seals that suggests that the pressure seal has degraded.

During normal operation of the leak test machine 130, a substantially constant pressure is applied to the pressure seals of the leak test machine 130. However, as the pressure seals degrade, the pressure applied to the pressure seals may decrease as pressure is lost through the degraded pressure seals. The predetermined pressure threshold can be selected to correspond to a pressure applied to the pressure seals that indicates a failure of the pressure seal.

As shown, if at least one pressure measurement is determined to be below the predetermined pressure threshold, the method 400 can proceed to 406. Otherwise, the method 400 can return back to 402.

At 406, at least one pressure seal failure can be identified. For example, the processor 112 can identify the pressure seals corresponding to the pressure measurements that were determined to be below the predetermined pressure threshold as failures.

In some embodiments, an alert indicating the identified pressure seal failures can generated, for example, transmitted by the communication interface 116. Additionally, or alternatively, a record of the identified pressure seal failures can be stored, for example, in the data storage 114. The records and/or alerts can be used to notify manufacturing line operators to replace the identified defective pressure seals.

As shown, subsequent to 406, acts 402, 404, and 406 can be executed again, so that the method 400 can be repeated. In this manner, the integrity of the pressure seals of the leak test machine 130 can be continuously monitored during operation of the manufacturing line 140.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It should also be noted that the terms "coupled" or "coupling" as used herein can have several different meanings depending in the context in which these terms are used. For example, the terms coupled or coupling may be used to indicate that an element or device can electrically, optically, or wirelessly send data to another element or device as well as receive data from another element or device. Furthermore, the term "coupled" may indicate that two elements can be directly coupled to one another or coupled to one another through one or more intermediate elements.

It should be noted that terms of degree such as "substantially", "about" and "approximately" as used herein mean a reasonable amount of deviation of the modified term such that the end result is not significantly changed. These terms of degree may also be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

Furthermore, any recitation of numerical ranges by endpoints herein includes all numbers and fractions subsumed within that range (e.g., 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

The example embodiments of the systems and methods described herein may be implemented as a combination of hardware or software. In some cases, the example embodiments described herein may be implemented, at least in part, by using one or more computer programs, executing on one or more programmable devices comprising at least one processing element, and a data storage element (including volatile memory, non-volatile memory, storage elements, or any combination thereof). These devices may also have at least one input device (e.g., a pushbutton keyboard, mouse, a touchscreen, and the like), and at least one output device (e.g., a display screen, a printer, a wireless radio, and the like) depending on the nature of the device. The devices may also have at least one communication device (e.g., a network interface).

It should also be noted that there may be some elements that are used to implement at least part of one of the embodiments described herein that may be implemented via software that is written in a high-level computer programming language such as object-oriented programming. Accordingly, the program code may be written in C, C++ or any other suitable programming language and may comprise modules or classes, as is known to those skilled in object-oriented programming. Alternatively, or in addition thereto, some of these elements implemented via software may be written in assembly language, machine language or firmware as needed. In either case, the language may be a compiled or interpreted language.

At least some of these software programs may be stored on a storage media (e.g., a computer readable medium such as, but not limited to, ROM, magnetic disk, optical disc) or a device that is readable by a general or special purpose programmable device. The software program code, when read by the programmable device, configures the programmable device to operate in a new, specific and predefined manner in order to perform at least one of the methods described herein.

Furthermore, at least some of the programs associated with the systems and methods of the embodiments described herein may be capable of being distributed in a computer program product comprising a computer readable medium that bears computer usable instructions for one or more processors. The medium may be provided in various forms, including non-transitory forms such as, but not limited to, one or more diskettes, compact disks, tapes, chips, and magnetic and electronic storage.

The present invention has been described here by way of example only, while numerous specific details are set forth herein in order to provide a thorough understanding of the exemplary embodiments described herein. However, it will be understood by those of ordinary skill in the art that these embodiments may, in some cases, be practiced without these specific details. In other instances, well-known methods, procedures and components have not been described in detail so as not to obscure the description of the embodiments. Various modification and variations may be made to these exemplary embodiments without departing from the spirit and scope of the invention, which is limited only by the appended claims.

The invention claimed is:

1. A method for calibrating a leak test machine for a manufacturing line, the leak test machine configured to detect leakage defects in workpieces produced by the manufacturing line, the method comprising operating at least one processor to:
  receive, from the leak test machine, defect data indicating a plurality of defect test results including a leak rate for at least one workpiece;
  receive, from at least one sensor, environmental data indicating a plurality of ambient environmental conditions at the leak test machine, each ambient environmental condition corresponding to a defect test result obtained while the leak test machine was subject to that ambient environmental condition;

update at least one predictive model using the defect data and the environmental data, the at least one predictive model operable to predict a defect test result for a workpiece based on at least one ambient environmental condition at the leak test machine;

receive, from the at least one sensor, current environmental data indicating at least one current ambient environmental condition at the leak test machine;

determine at least one calibration setting including a leak offset rate for the leak test machine based on the at least one predictive model and the current ambient environmental data corresponding to the leak rate for the workpiece under the current ambient environmental condition, the at least one calibration setting compensating for an effect of the at least one current ambient environmental condition on the leak test machine; and test, with the leak test machine using the at least one calibration setting, at least one other workpiece to obtain at least one calibrated defect test result for the at least one other workpiece.

2. The method of claim 1, wherein the at least one sensor comprises at least one pressure sensor disposed within one or more seals of the leak test machine.

3. The method of claim 2, further comprising operating the at least one processor to:

identify one or more failures within the one or more pressure seals based on pressure measurements obtained from the at least one pressure sensor.

4. The method of claim 3, wherein identifying the one or more failures within the one or more pressure seals comprises:

determining whether at least one pressure measurement obtained from the at least one pressure sensor is below a predetermined pressure threshold.

5. The method of claim 1, wherein the at least one sensor comprises at least one temperature sensor configured to measure a temperature of at least one of: i.) the leak test machine, or ii.) the workpieces.

6. The method of claim 5, wherein the least one temperature sensor is configured to measure an ambient temperature of air adjacent at least one of: i.) the leak test machine, or ii.) the workpieces.

7. The method of claim 1, wherein using the at least one calibration setting by the leak test machine comprises applying an offset to leak rates measured by the leak test machine.

8. The method of claim 1, wherein using the at least one calibration by the leak test machine comprises adjusting at least one of: i.) a fill time of the leak test machine, or ii.) a cycle time of the leak test machine.

9. The method of claim 1, further comprising operating the at least one processor to:

update the at least one predictive model using workpiece data indicating one or more physical characteristics of the workpieces.

10. The method of claim 1, further comprising operating the at least one processor to:

test, with the leak test machine, a plurality of workpieces to obtain the plurality of defect test results, each defect test result obtained while the leak test machine was subject to the corresponding ambient environmental condition.

11. The method of claim 1, further comprising operating the at least one processor to:

test, with the leak test machine, a defectless master workpiece to obtain the plurality of defect test results, each defect test result obtained while the leak test machine was subject to the corresponding ambient environmental condition.

12. The method of claim 1, wherein testing the at least one other workpiece comprises operating the at least one processor to:

test, with the leak test machine using a first calibration setting, a first workpiece to obtain a calibrated defect test result for the first workpiece; and test, with the leak test machine using a second calibration setting, a second workpiece to obtain at least one calibrated defect test result for the second workpiece;

wherein the second workpiece is a different workpiece type than the first workpiece, and the first calibration setting is different than the first calibration setting.

13. The method of claim 1, further comprising operating the at least one processor to:

generate at least a portion of the current environmental data indicating the at least one current ambient environmental condition at the leak test machine using at least one other predictive model.

14. A system for calibrating a leak test machine for a manufacturing line, the leak test machine configured to detect leakage defects in workpieces produced by the manufacturing line, the system comprising:

at least one sensor operable to measure ambient environmental conditions at the leak test machine; and at least one processor in communication with the at least one sensor and the leak test machine, the at least one processor operable to:

receive, from the leak test machine, defect data indicating a plurality of defect test results including a leak rate for at least one workpiece;

receive, from at least one sensor, environmental data indicating a plurality of ambient environmental conditions at the leak test machine, each ambient environmental condition corresponding to a defect test result obtained while the leak test machine was subject to that ambient environmental condition;

update at least one predictive model using the defect data and the environmental data, the at least one predictive model operable to predict a defect test result for a workpiece based on at least one ambient environmental condition at the leak test machine;

receive, from the at least one sensor, current environmental data indicating at least one current ambient environmental condition at the leak test machine;

determine at least one calibration setting including a leak offset rate for the leak test machine based on the at least one predictive model and the current ambient environmental data corresponding to the leak rate for the workpiece under the current ambient environmental condition, the at least one calibration setting compensating for an effect of the at least one current ambient environmental condition on the leak test machine; and transmit the at least one calibration setting to the leak test machine, wherein the leak test machine is operable to test, using the at least one calibration setting, at least one other workpiece to obtain at least one calibrated defect test result for the at least one other workpiece.

15. The system of claim 14, wherein the at least one sensor comprises at least one pressure sensor disposed within one or more seals of the leak test machine.

16. The system of claim 15, wherein the at least one processor is operable to:

identify one or more failures within the one or more pressure seals based on pressure measurements obtained from the at least one pressure sensor.

17. The system of claim 16, wherein identifying the one or more failures within the one or more pressure seals comprises:
determining whether at least one pressure measurement obtained from the at least one pressure sensor is below a predetermined pressure threshold.

18. The system of claim 14, wherein the at least one sensor comprises at least one temperature sensor configured to measure a temperature of at least one of: i.) the leak test machine, or ii.) the workpieces.

19. The system of claim 14, wherein using the at least one calibration setting by the leak test machine comprises applying an offset to leak rates measured by the leak test machine.

20. The system of claim 14, wherein using the at least one calibration by the leak test machine comprises adjusting at least one of: i.) a fill time of the leak test machine, or ii.) a cycle time of the leak test machine.

* * * * *